(12) United States Patent
Fanelli et al.

(10) Patent No.: US 11,384,825 B2
(45) Date of Patent: Jul. 12, 2022

(54) COMPACT BELTED STRAIN WAVE GEAR APPARATUS AND A VEHICLE LIFTING SYSTEM INCLUDING THE COMPACT BELTED STRAIN WAVE GEAR APPARATUS

(71) Applicant: BeijingWest Industries Co., Ltd., Beijing (CN)

(72) Inventors: Dominique Fanelli, Bouffemont (FR); Pierre-Luc Kovac, Chelles (FR); Jocelyn Marchand, Levallois Perret (FR)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 223 days.

(21) Appl. No.: 16/894,702

(22) Filed: Jun. 5, 2020

(65) Prior Publication Data

US 2020/0386303 A1 Dec. 10, 2020

Related U.S. Application Data

(60) Provisional application No. 62/858,776, filed on Jun. 7, 2019.

(30) Foreign Application Priority Data

May 29, 2020 (CN) .......................... 202010472564.0

(51) Int. Cl.
*F16H 49/00* (2006.01)
(52) U.S. Cl.
CPC ..... *F16H 49/001* (2013.01); *F16H 2049/003* (2013.01)
(58) Field of Classification Search
CPC .................................................. F16H 49/001
(Continued)

(56) References Cited

U.S. PATENT DOCUMENTS 3,160,032 A * 12/1964 Black ..................... F16H 1/32
74/462
3,187,605 A 6/1965 Ericson
(Continued)

FOREIGN PATENT DOCUMENTS

CN 103727209 A 4/2014
CN 106062413 A 10/2016
(Continued)

OTHER PUBLICATIONS

First Office Action and search report dated Feb. 23, 2021 for counterpart Chinese patent application No. 202010472564.0 along with machine EN translation downloaded from EPO.
(Continued)

*Primary Examiner* — Ha Dinh Ho
(74) *Attorney, Agent, or Firm* — William H. Honaker; Dickinson Wright PLLC

(57) ABSTRACT

A wave gear apparatus comprises a spline having top, bottom, exterior, and interior surfaces. A plurality of spline teeth extend from the interior surface toward a center axis. A wave generator is rotatably disposed in the spline. A belt extends about the wave generator. The belt includes a plurality of belt teeth extending radially outwardly from the belt whereby a total number of the belt teeth is less than a total number of the spline teeth. An output member defines a recess receiving the wave generator and the belt whereby, in response to a rotational movement from the wave generator, the output member rotates in a direction same or opposite of the wave generator. A vehicle lifting system including the wave gear apparatus is also disclosed herein.

28 Claims, 11 Drawing Sheets

(58) Field of Classification Search
USPC .......................................................... 74/640
See application file for complete search history.

(56) References Cited

U.S. PATENT DOCUMENTS

| | | | |
|---|---|---|---|
| 3,906,527 A | 9/1975 | Erlichman | |
| 3,986,412 A * | 10/1976 | Farley | F16H 49/001 |
| | | | 475/5 |
| 4,237,751 A * | 12/1980 | Davis | F16H 49/001 |
| | | | 416/170 R |
| 8,020,470 B2 * | 9/2011 | Saito | F16H 49/001 |
| | | | 74/640 |
| 8,195,361 B2 | 6/2012 | Kajino et al. | |
| 9,136,745 B2 | 9/2015 | Nagahama | |
| 9,266,604 B2 | 2/2016 | Salamat et al. | |
| 9,415,655 B2 | 8/2016 | Willems | |
| 10,584,782 B2 * | 3/2020 | Balsiger | B64C 13/34 |
| 2019/0153909 A1 | 5/2019 | Hain et al. | |

FOREIGN PATENT DOCUMENTS

| | | |
|---|---|---|
| CN | 206522422 U | 9/2017 |
| CN | 107387725 A | 11/2017 |
| DE | 102016219076 A1 | 8/2017 |
| DE | 102017202541 A1 | 8/2018 |
| EP | 2574745 A1 | 4/2013 |
| EP | 3271614 B1 | 4/2019 |
| JP | 62209247 A | 9/1987 |
| JP | 2009299780 A | 12/2009 |
| JP | 2013119919 A | 6/2013 |
| SU | 1321963 A1 | 12/1985 |
| SU | 1416299 A1 | 8/1988 |
| WO | 2009157607 A1 | 12/2009 |
| WO | 2018149560 A1 | 8/2018 |

OTHER PUBLICATIONS

Extended European Search Report dated Mar. 10, 2021 for counterpart European patent application No. 20178503.7.
The partial European Search Report dated Sep. 14, 2020, for counterpart European Patent Application No. 20178503.7.
First Office Action issued for corresponding Japanese Patent Application 2020-096688 dated Jul. 20, 2021.

* cited by examiner

COMPACT BELTED STRAIN WAVE GEAR APPARATUS AND A VEHICLE LIFTING SYSTEM INCLUDING THE COMPACT BELTED STRAIN WAVE GEAR APPARATUS

CROSS-REFERENCE TO RELATED APPLICATIONS

This application claims the benefits of U.S. Provisional Application Patent Ser. No. 62/858,776, filed on Jun. 7, 2019 and Chinese Patent Application No. 202010472564.0, filed May 29, 2020, all of which are hereby incorporated by reference in their entireties.

BACKGROUND OF THE INVENTION

1. Field of the Invention

The present invention generally relates to a strain wave gear apparatus and, in particular, a strain wave gear apparatus for use with a vehicle lifting system.

2. Description of the Prior Art

Harmonic drives are well known in the art. Typically, the harmonic drives are a single-stage gear transmission having three main components. These components are known as the circular spline, the flexspline, and the wave generator. The circular spline is a circular, rigid sun gear with teeth on its inner surface. The flexspline is a thin-walled cup with teeth on its outer surface, which are designed to mesh with the teeth of the circular spline. The flexspline is radially flexible and torsionally rigid, and has fewer teeth and a smaller radius than the circular spline. The wave generator is a non-circular cam, which fits inside the flexspline and deforms it to cause some of its teeth to mesh with the teeth of the circular spline and others to completely unmesh. Each full rotation of the wave generator causes the flexspline to walk around the circular spline at a rate equal to the difference in the number of teeth of the flexspline to the number of teeth of the circular spline. For example, if the circular spline has 100 teeth and the flexspline has 98 teeth, each revolution of the wave generator will walk the flexspline around the circular spline a distance equal to two teeth. For example, if the circular spline has 100 teeth and the flexspline has 98 teeth and the output member has 98 teeth, each revolution of the wave generator will walk the flexspline around the circular spline a distance equal to two teeth. In this case, the output member rotates in the opposite direction of the wave generator. In another case, if the circular spline has 98 teeth and the flexspline has 98 teeth, and the output member has 100 teeth, each revolution of the wave generator will again walk the flexspline around the circular spline a distance equal to two teeth. In this case, the output member rotates in the same direction of the wave generator.

Industries benefiting from harmonic drive gearing include semiconductor, machine tool, factory automation, robotics, medical equipment and aerospace. Medical applications benefiting from harmonic drive gearing include patient beds, rehabilitations equipment, and MRI/CAT scan gantries. Other uses for harmonic drives include radiation therapy equipment, imaging camera positioning and surgical robots. Robots used in semiconductor component manufacturing use harmonic drives to accurately position wafers for processing, loading, unloading, inspection and test. Military and aerospace applications of harmonic drive gearing include communication, military surveillance, and weather satellites, several deep space probes, telescopes including the Hubble Space Telescope, and the International Space Station. Harmonic Drives are used to accurately control antennas and compass gimbals, to align scientific instruments, adjust apertures and solar panels and open and close hatches and doorways.

These applications require high positional accuracy, repeatability, and low vibration. Harmonic drive gear sets are ideal for precision applications that require a compact design and high torque to weight ratio. They are capable of less than one arc minute positional accuracy and repeatability of +/−5 arc seconds without the benefit of feedback at the output stage The traditional design for harmonic drive gearing involves a flexspline with two fewer teeth than the circular spline and an elliptical wave generator designed such that it causes the teeth of the flexspline to mesh with the teeth of the circular spline in two zones, diametrically opposed to each other and corresponding to the major axis of the ellipse. The minor axis of the wave generator is short enough that it allows the teeth of the flexspline to completely unmesh in the zones along the minor axis and allows a one-tooth difference in length between the circular spline and the flexspline in the areas of no contact. The torque capacity of the gearing system is equal to the shear force necessary to cause the teeth in contact to fail. This so allows the existence of a "ratcheting torque," under which the flexspline may slip by a distance of one tooth relative to the circular spline. This increases the number of teeth in contact and therefore the torque capacity and the torsional rigidity. However, this condition greatly increases the forces on the flexspline, greatly reducing its fatigue life. Furthermore, it throws the system out of balance, greatly increasing noise and vibration and reducing positional accuracy.

One such a harmonic drive gearing is disclosed in U.S. Pat. No. 3,906,527. The harmonic drive gearing includes a spline having a top surface, a bottom surface, an exterior surface, and an interior surface. The top surface and the bottom surface are axially spaced from one another. The exterior surface and the interior surface extend about a center axis connecting the top surface with the bottom surface. A plurality of spline teeth extend from the interior surface toward the center axis. A wave generator is rotatably disposed in the spline.

Accordingly, there exist a need to provide a harmonic drive that minimizes the motor size, is adaptable to different vehicle architectures, light weight, and low noise, vibration, and harshness (NVH).

SUMMARY OF THE INVENTION

The present invention provides a wave gear apparatus that is light weight and compact. The present invention also provides wave gear apparatus that is easy to assemble. The present invention further provides a wave gear apparatus that has a minimum noise, vibration, and harshness (NVH).

It is one aspect of the present invention to provide a wave gear apparatus. The wave gear apparatus comprises a spline having a top surface, a bottom surface, an exterior surface, and an interior surface. The top surface and the bottom surface are axially spaced from one another. The exterior surface and the interior surface extend about a center axis connecting the top surface with the bottom surface. A plurality of spline teeth extend from the interior surface toward the center axis. A wave generator is rotatably disposed in the spline. A belt extends about the wave generator.

The belt includes a plurality of belt teeth extending radially outwardly from the belt for engaging the spline teeth whereby a total number of the belt teeth is less than a total number of the spline teeth. An output member defines a recess receiving the wave generator and the belt and in engagement with the wave generator and the belt whereby, in response to a rotational movement from the wave generator, the output member rotates in a direction same or opposite of the wave generator.

It is another aspect of the present invention to provide a wave gear apparatus. The wave gear apparatus comprises a spline having a top surface, a bottom surface, an exterior surface, and an interior surface. The top surface and the bottom surface are axially spaced from one another. The exterior surface and the interior surface extend about a center axis connecting the top surface with the bottom surface. A plurality of spline teeth extend from the interior surface toward the center axis. A wave generator is rotatably disposed in the spline. A belt extends about the wave generator. The belt includes a plurality of belt teeth extending radially outwardly from the belt for engaging the spline teeth whereby a total number of the belt teeth is less than a total number of the spline teeth. An output member receives the wave generator and the belt and in engagement with the wave generator and the belt whereby the output member includes a wall having a plurality of wall teeth and the wall teeth having a second teeth profile, the second teeth profile is different from the first teeth profile.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
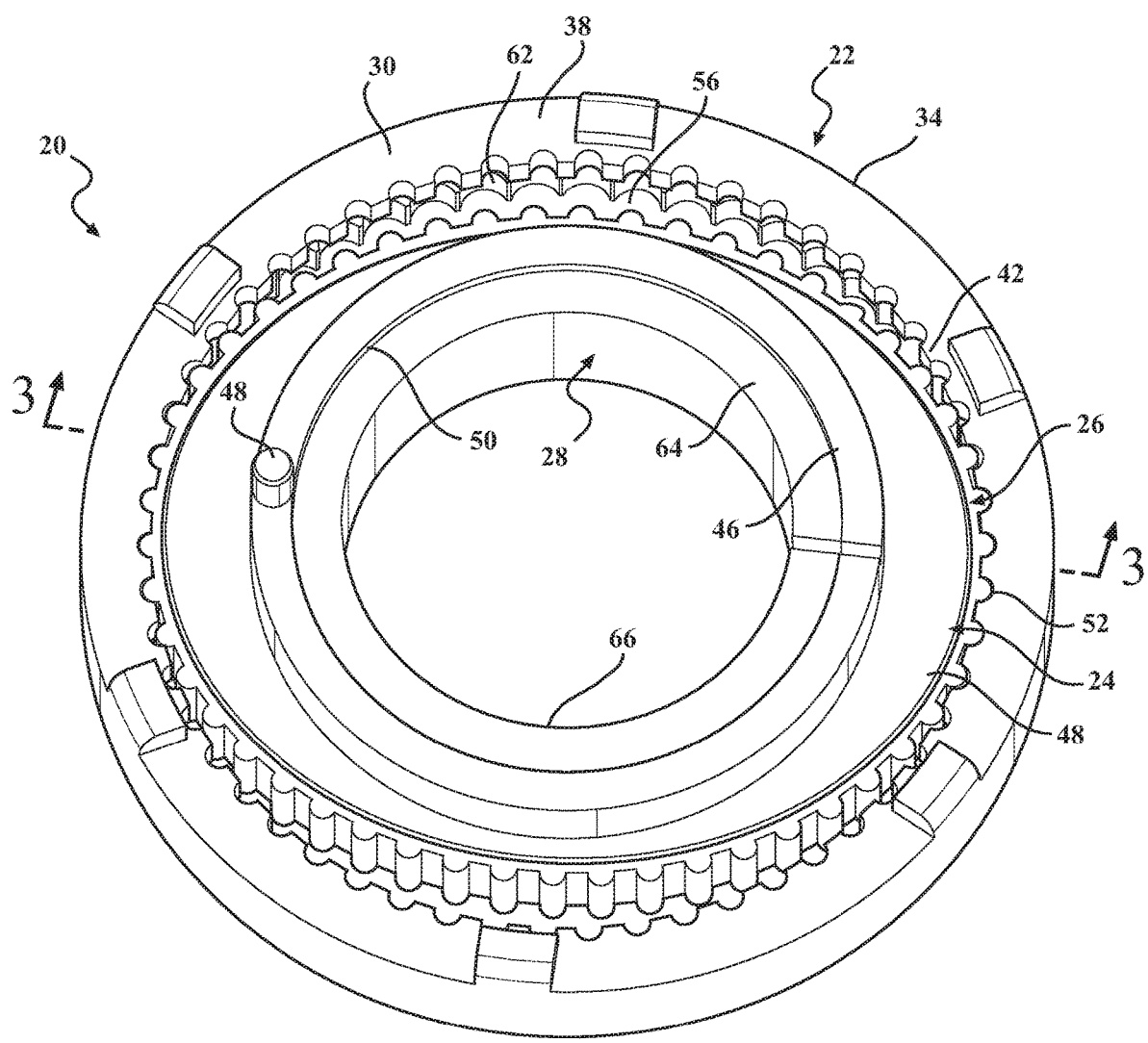
FIG. 1 is a top perspective view of a wave gear apparatus constructed in accordance with one embodiment of the present invention.

Referring to the Figures, wherein like numerals indicate corresponding parts throughout the several views, a wave gear apparatus 20 constructed in accordance with one embodiment of the present invention is generally shown in FIG. 1.

Figure 2:
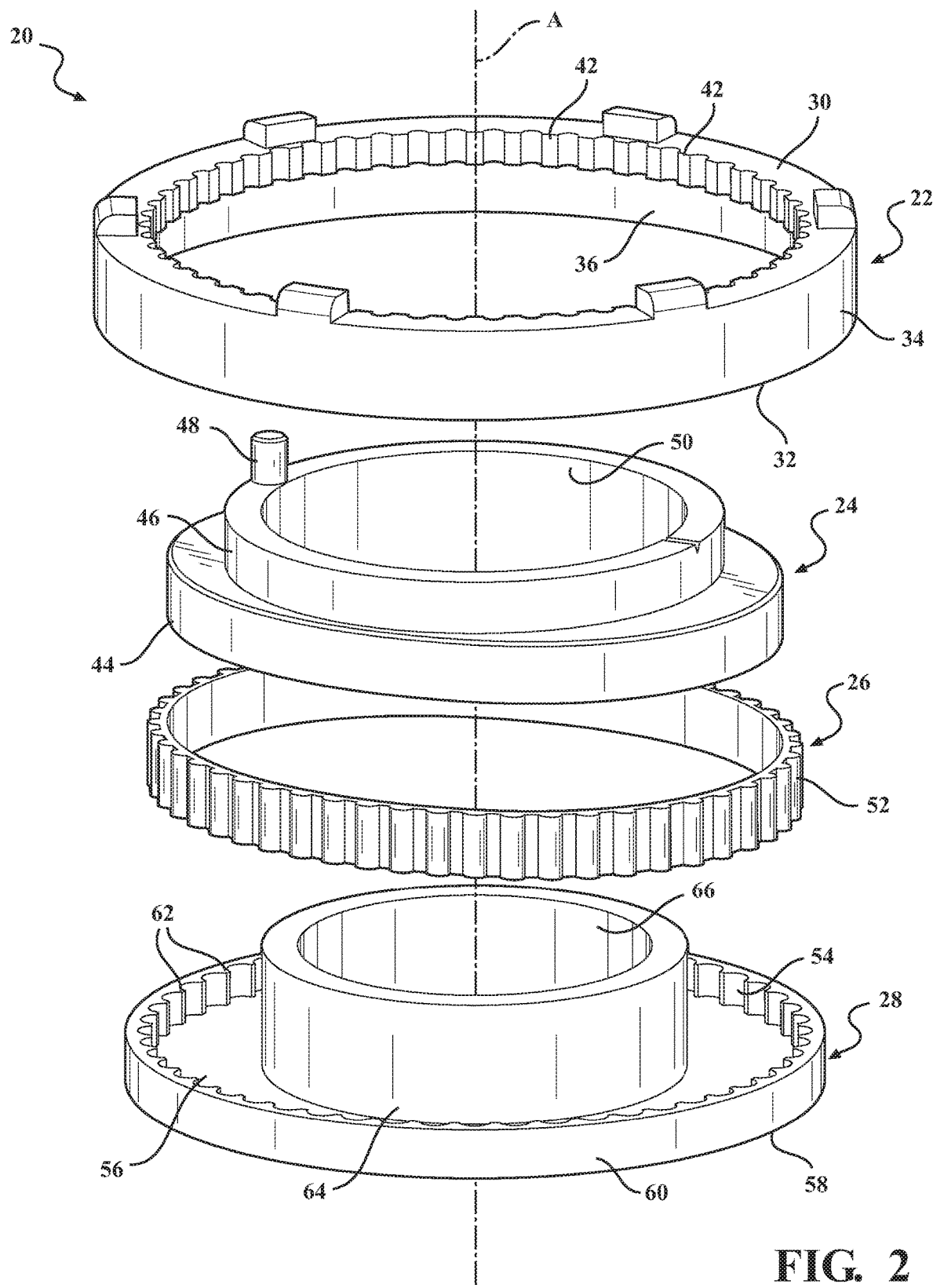
FIG. 2 is an exploded view of the wave gear apparatus.
Figure 3:
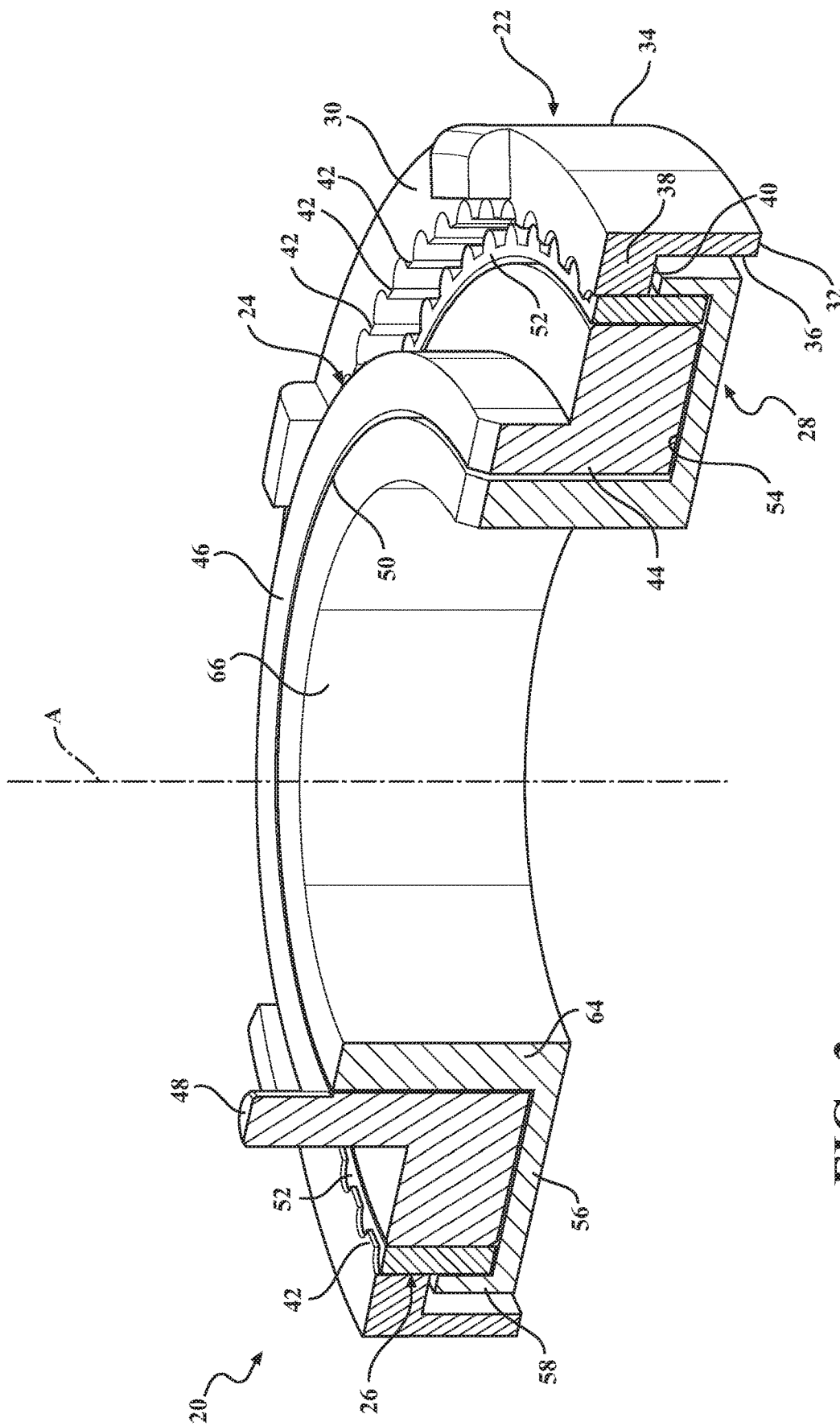
FIG. 3 is an assembled cross-sectional perspective view of the wave gear apparatus in accordance with one embodiment of the present invention along lines 3-3 of FIG. 1.

As best shown in FIGS. 1-3, the wave gear apparatus 20 comprises a spline 22, a wave generator 24, a belt 26, and an output member 28. The spline 22 has a top surface 30, a bottom surface 32, an exterior surface 34, and an interior surface 36. The top surface 30 and the bottom surface 32 are spaced apart from one another. The exterior surface 34 and the interior surface 36 extend about a center axis A connecting the top surface 30 with the bottom surface 32. The spline 22 includes a projection 38, located on the interior surface 36 and adjacent to the top surface 30, radially inwardly toward the center axis A and annularly about the center axis A. The projection 38 also extends along the interior surface 36 from the top surface 30 toward the bottom surface 32 to a terminal end 40 spaced from the bottoms surface 32. The projection 38 includes a plurality of spline teeth 42 extending radially inwardly from the interior surface 36 and along the projection 38 and circumferentially spaced from one another. Accordingly to one embodiment of the present invention, each spline tooth of the plurality of spline teeth 42 has a generally trapezoidal shape to present a first teeth profile.

A wave generator 24 rotatably disposed in the spline 22 for engagement with the spline 22. The wave generator 24 has a bottom portion 44 and a top portion 46. The bottom portion 44, having a generally elliptical shape, extending about the center axis A. The top portion 46, having a generally circular shape, extends outwardly from the bottom portion 44. A protrusion 48 extends outwardly from the top portion 46, parallel to the center axis A. The wave generator 24 defines a bore 50 extending along the center axis A through the top portion 46 and the bottom portion 44. A belt 26 extends about the bottom portion 44. The belt 26 includes a plurality of belt teeth 52 extending radially outwardly from the belt 26 for engaging the spline teeth 42, i.e. the belt teeth 52 diametrically meshes with the spline teeth 42, whereby a total number of the belt teeth 52 is less than a total number of the spline teeth 42. According to an embodiment of the present invention, the belt 26 can be made from an elastomeric material. According an embodiment of the present invention, a difference between the total number of the spline teeth 42 and the total number of the belt teeth 52 is equal to 2 or 4. Because the total number of the belt teeth 52 is less than the total number of spline teeth 42, this create a reduction ratio between the rotational speed of the rotor and the rotational speed of the wave generator 24.

The output member 28 defines a recess 54 for receiving the wave generator 24 and the belt 26. The output member 28 in engagement with the wave generator 24 and the belt 26 whereby, in response to a rotational movement from the wave generator 24, the output member 28 rotates in a direction same or opposite of the wave generator 24. With the wave generator 24 being received in the recess 54 of the output member 28, this makes the wave gear apparatus 20 more compact and allows for an easy assembly of the wave gear apparatus 20. The output member 28 includes a base plate 56, having a generally circular shape, is disposed on the center axis A and in abutment relationship with the belt 26 and the wave generator 24. The base plate 56 has a periphery 58 extending about the center axis A. A wall 60 extends outwardly from the periphery 58 and about the center axis A for engagement with the spline 22. The wall 60 includes a plurality of wall teeth 62, spaced from one another, extending outwardly from the wall 60 and radially toward the center axis A for engagement with the belt 26 to allow the output member 28 to rotate in a same speed as the belt 26 and the wave generator 24. The wall teeth 62 present a second teeth profile that is different from the first teeth profile of the spline teeth 42 to allow the output member 28 to rotate in the same speed as the belt and the wave generator 24. According to one embodiment of the present invention, each wall tooth of the plurality of wall teeth 62 has a generally triangular shape to present the second teeth profile. The output member 28 includes a collar 64 extending outwardly from the base plate 56 and annularly about the center axis A to define the recess 54 extending about the center axis A and between the collar 64, the base plate 56, and the wall 60. The collar 64 extends through the bore 50 and defines a hole 66 extending along the center axis A.

Figure 4:
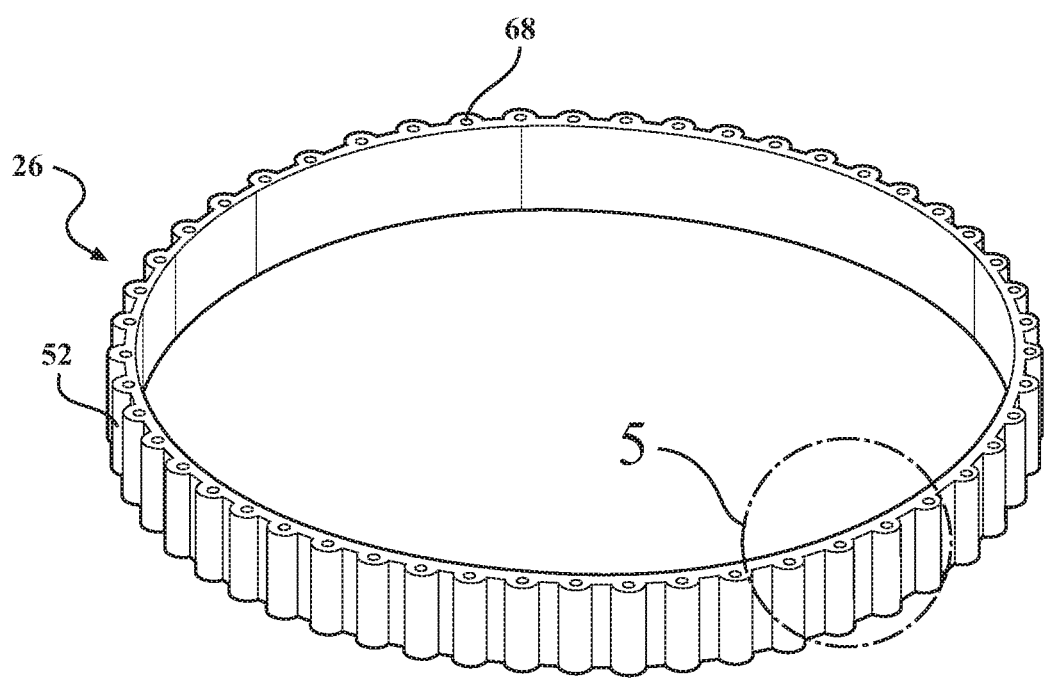
FIG. 4 is perspective view of a belt used in the wave gear apparatus in accordance with one embodiment of the present invention.
Figure 5:
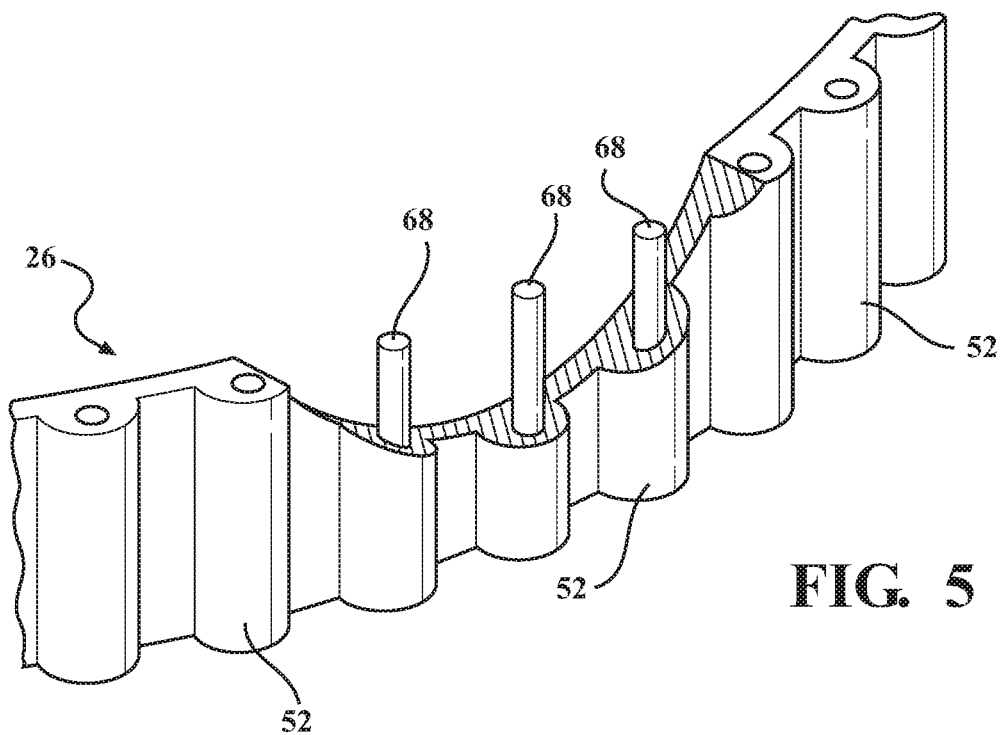
FIG. 5 is an enlarged fragmentary view of the belt in FIG. 4.
Figure 6:
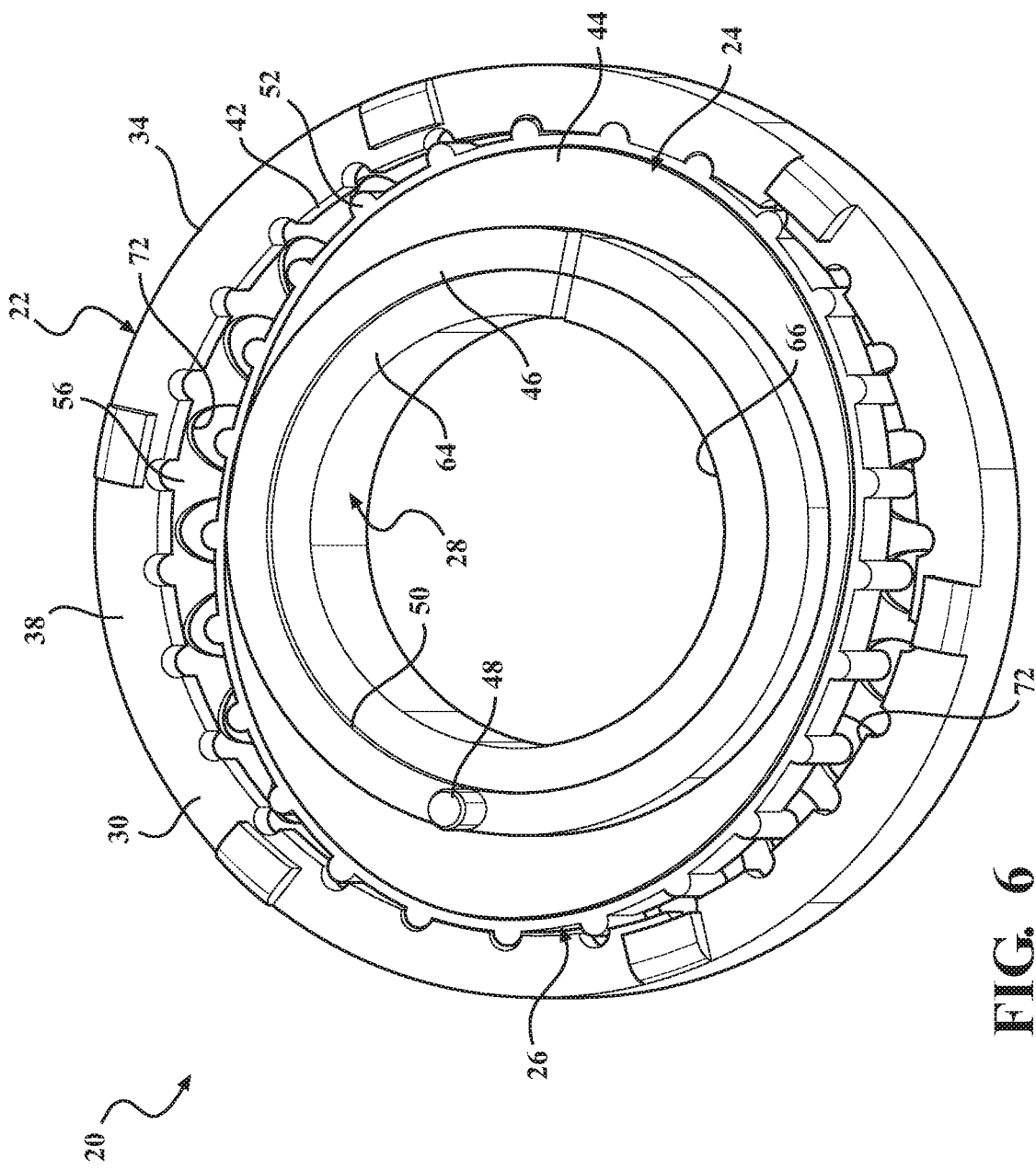
FIG. 6 is a top perspective view of a wave gear apparatus constructed in accordance with an alternative embodiment of the present invention.
Figure 7:
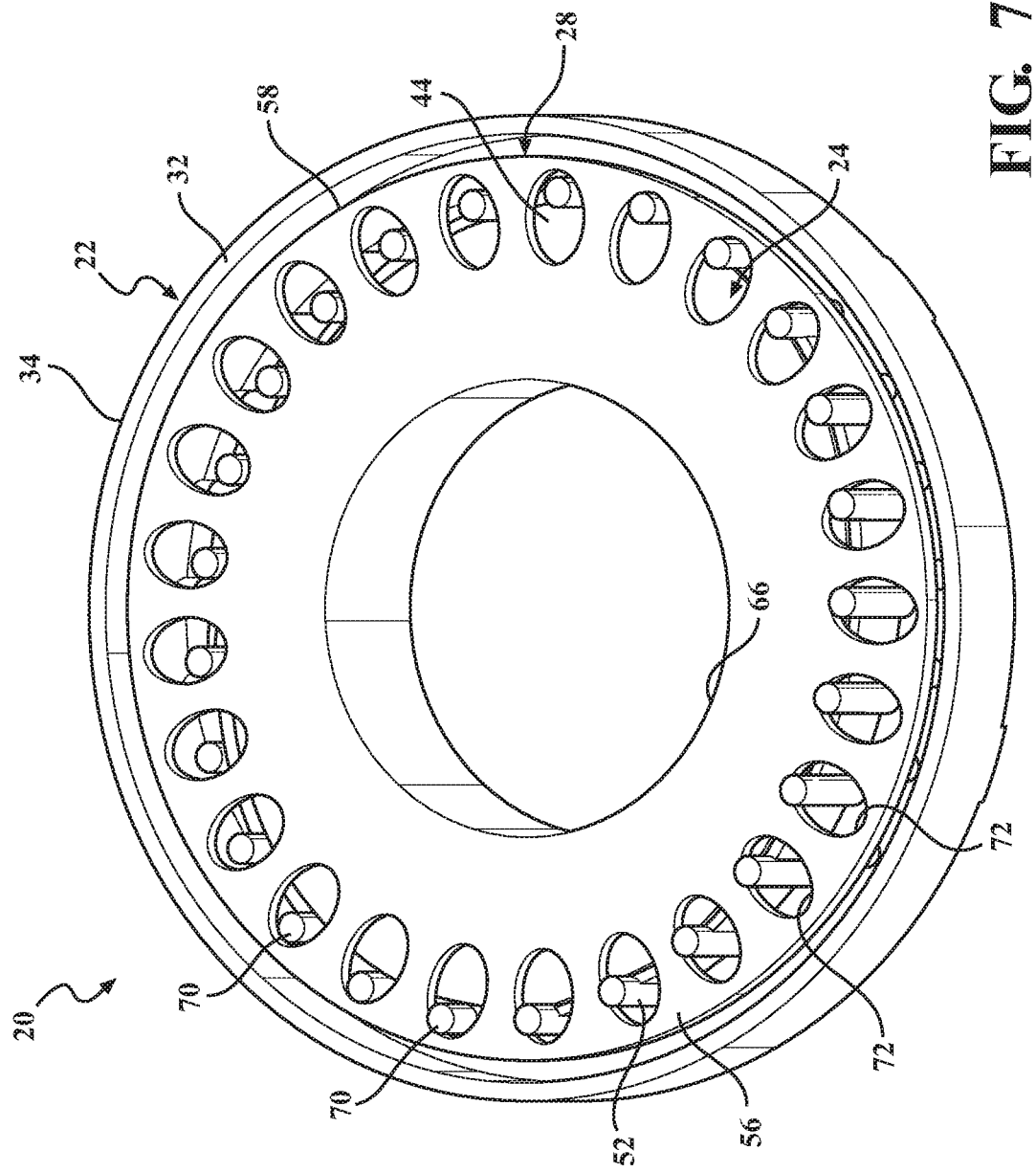
FIG. 7 is a bottom perspective view of the wave gear apparatus of FIG. 6.

FIGS. 4-7 illustrate an alternative embodiment of the present invention. As best illustrated in FIGS. 4-5, each belt tooth of the plurality of belt teeth 52 includes a metal insert 68 disposed therein to provide reinforcement and rigidity to the belt teeth 52. The metal insert 68 extends along the center axis A through the belt 26 to an insert end 70 spaced apart from the belt 26. As best shown in FIGS. 6-7, the base plate 56 defines a plurality of apertures 72 disposed about the center axis A to receive the insert end 70 thereby coupling the output member 28 to the wave generator 24 and the belt 26 for rotation with the wave generator 24 and the belt 26.

In operation, an input of a rotational movement or a torque load is first introduced to the wave gear apparatus 20 via the wave generator 24. It should be appreciated that the input can be applied via an electric motor or any other rotational movement generating source. According to one embodiment of the present invention, the protrusion 48 of the wave generator 24 can be coupled to the electric motor or the rotational movement generating source allowing the wave generator 24 to introduce the rotational movement to the wave gear apparatus 20. As the wave generator 24 rotates in the spline 22, the belt 26 deforms in response to the movement of the wave generator 24 and slides around the wave generator 24. As the belt 26 slides around the wave generator 24, the top half of the belt teeth 52 is in mesh engagement with the spline teeth 42. Because the total number of the belt teeth 52 is less than the total number of spline teeth 42, as the wave generator 24 rotates in the spline 22, the rotational speed of the wave generator 24 is reduced. In addition, as the belt 26 slides around the wave generator 24, the bottom half of the belt teeth 52 is in mesh engagement with the wall teeth 62. Because the total number of the wall teeth 62 is equal to the total number of the belt teeth 52, the output member 28 rotates, in a direction that is the same or opposite of the rotational direction of the wave generator 24. Accordingly, because the belt teeth 52 engage both the spline teeth 42 and the wall teeth 62, a shear force is generated due to the introduction of the torque load. According to one embodiment of the present invention, the belt 26 can be made from an elastomeric material, e.g. rubber. With the belt 26 being made from the elastomeric material, it can withstand the shear force generated due to the introduction of the rotational movement or torque load thereby reducing the noise, vibration, and harshness levels (NVH) of the wave gear apparatus.

Figure 8:
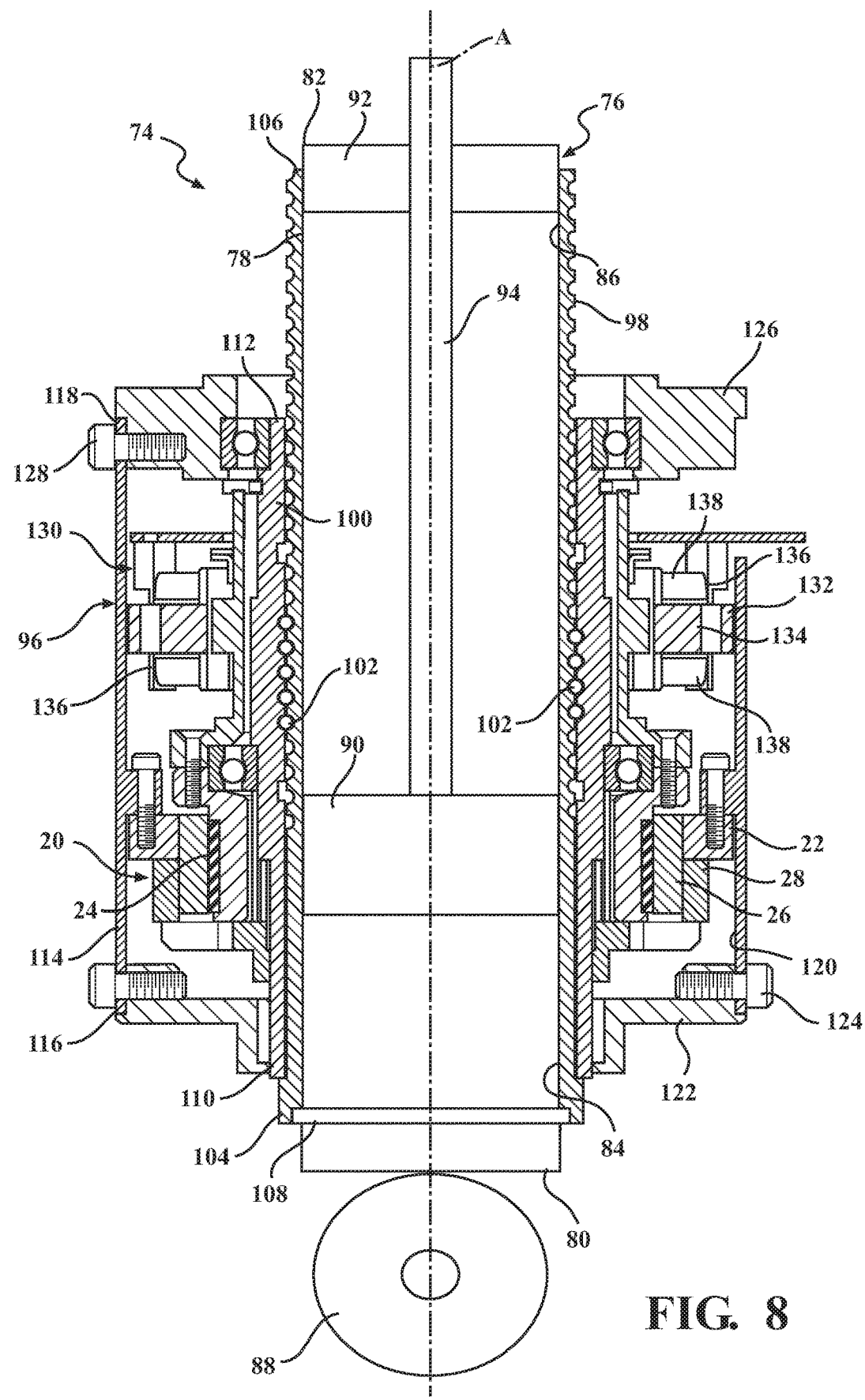
FIG. 8 is a cross-sectional perspective view of a damper including a vehicle lift system including the wave gear apparatus.

It is another aspect of the present invention to provide a vehicle lift system 74. The vehicle lift system 74 constructed in accordance with one embodiment of the present invention is generally shown in FIG. 8.

The vehicle lift system 74 can used in connection with a damper 76 of a vehicle. It should be appreciated that the damper 76 can be a hydraulic damper or a magnetorheological (MR) damper. As best illustrated in FIG. 8, the damper 76 includes a housing 78, having a generally cylindrical shape, disposed on a center axis A. The housing 78 extends between a first end 80 and a second end 82 and defines a fluid chamber 84, 86 extending between the first end 80 and the second end 82 for containing a working fluid. It should be appreciated that the working fluid can be a hydraulic fluid or an MR fluid. A mounting ring 88, having a generally circular shape, attaches to the first end 80 of the housing 78 for attachment with the vehicle.

A piston 90, slidably disposed in the fluid chamber 84, 86, divides the fluid chamber 84, 86 into a compression chamber 84 and a rebound chamber 86. The compression chamber 84 extends between the first end 80 of the housing 78 and the piston 90. The rebound chamber 86 extends between the second end 82 of the housing 78 and the piston 90. A rod guide 92, disposed in the rebound chamber 86, attaches to the second end 82 of the piston 90 to close the fluid chamber 84, 86. A piston rod 94 extends along the center axis A, through the rod guide 92 and into the rebound chamber 86, and attaches to the piston 90 for moving the piston 90 along the center axis A between a compression stroke and a rebound stroke. The compression stroke is defined as the piston rod 94 and the piston 90 moving toward the first end 80 of the housing 78. The rebound stroke is defined as the piston rod 94 and the piston 90 moving toward the second end 82 of the housing 78.

An actuator 96 attaches to the housing 78 for modifying a height of a vehicle allowing the vehicle to adapt to different drive modes. The actuator 96 includes a threaded shaft 98, a threaded bushing 100, and a plurality of bushing ball bearings 102. The threaded shaft 98, having a generally tubular shape, attaches to an exterior surface of the housing 78 and extends annularly about the center axis A between a first opened end 104 and a second opened end 106. The first opened end 104 is located adjacent to the first end 80 of the housing 78 and attached to the housing 78. The second opened end 106 is axially spaced from the first end 80 and is attached to the housing 78. A snap ring 108, having a generally circular shape, is located adjacent the first open end 104 between the threaded shaft 98 and the housing 78 and extends about the center axis A for securing the threaded shaft 98 to the housing 78. In other words, the threaded shaft 98 is fixated onto the housing 78 and extends annularly about the housing 78. The threaded bushing 100, disposed about the threaded shaft 98, is rotatable about the center axis A and axially movable along the threaded shaft 98. The threaded bushing 100 extends between a primary end 110 and a secondary end 112. The primary end 110 of the threaded bushing 100 is located adjacent to the first opened end 104 of the threaded shaft 98. The secondary end 112 of the threaded bushing 100 is located axially spaced from the second opened end 106. The plurality of bushing ball bearings 102 are located between the threaded bushing 100 and the threaded shaft 98 for allowing the threaded bushing 100 to rotate about the threaded shaft 98 and translate a rotational movement of the threaded bushing 100 into an axial movement along the threaded shaft 98.

A cover 114, having a generally tubular shape, is disposed about the center axis A and radially spaced from the threaded bushing 100. The cover 114 extends along the center axis A between a proximate end 116 and a distal end 118 wherein the proximate end 116 is located adjacent to the primary end 110 of the threaded bushing 100 and the distal end 118 is located adjacent to the secondary end 112 of the threaded bushing 100. The cover 114 and the threaded bushing 100 collective define a compartment 120 extending about the center axis A between the cover 114 and the threaded bushing 100. An end plate 122 extends radially inwardly from the proximate end 116 to the primary end 110 and in an abutment relationship with the primary end 110. A plurality of fasteners 124, disposed adjacent to the proximate end 116 of the cover 114 and extends through the cover 114 and the end plate 122 attaching the end plate 122 to the cover 114. A spring seat 126, disposed in the compartment 120, extends between the distal end 118 of the cover 114 and the secondary end 112 of the threaded bushing 100. The spring seat 126 attaches to the cover 114 and the threaded bushing 100 for receiving a coil spring (not shown) extending helically about the housing 78. A plurality of bolts 128, disposed adjacent to the distal end 118 of the cover 114 and extends through the cover 114 and the spring seat 126 attaching the spring seat 126 to the cover 114. A plurality of cover ball bearings 128 disposed between the spring seat 126 and the threaded bushing 100 for allowing the threaded bushing 100 to rotate about spring seat 126.

An electric motor 130 is disposed in the compartment 120, coupled to the threaded bushing 100, for providing a rotational movement to the threaded bushing 100 to move the threaded bushing 100 axially along the threaded shaft 98 to raise and lower the height of the vehicle. In other words, the electrical motor 130 imitates a rotational movement for raising and lowering the height of the vehicle. The electric motor 130 includes a rotor 132, having a generally tubular shape, disposed adjacent to the secondary end 112 of the threaded bushing 100 and rotatable about the center axis A. A body 134, having a cylindrical shape, is disposed about the rotor 132 and extends annularly about the center axis A. A pair of bobbins 136, axially spaced from one another and adjacent to the body 134, extends annularly about the center axis A sandwiching the body 134 between the bobbins 136. Each of the bobbins 136 includes a coil 138 extending about the center axis A, in electrical connection with a power source for providing a current to the coils 138 thereby generating a magnetic field to rotate the rotor 132 in the compartment 120.

The wave gear apparatus 20 is disposed located in the compartment 120 and coupled to the primary end 110 of the threaded shaft 98 and the rotor 132 for reducing the rotational speed of the rotor 132 and increase torque of the electric motor 130 to rotate the threaded bushing 100 about the center axis A. According to one embodiment of the present invention, the spline 22 is disposed in the compartment 120, adjacent to the rotor 132, attached to the cover 114. The wave generator 24 is rotatably disposed in the spline 22 for engagement with the electric motor 130 to transferring the rotational movement of the rotor 132 to the threaded shaft 98. The protrusion 48, extending outwardly from the top portion 46 of the wave generator 24, couples the wave generator 24 to the rotor 132 of the electric motor 130 for rotational movement with the rotor 132.

The output member 28, receiving the wave generator 24 and the belt 26, couples to the threaded bushing 100 for transferring rotational movement of the rotor 132 to the threaded bushing 100. The collar 64 of the output member extends about the center axis A and is coupled to the threaded bushing 100 for rotation with the threaded bushing 100.

In operation, to raise and lower the height of the vehicle, the electric motor 130 initiates a rotational movement to the wave gear apparatus 20 via the rotor 132. In response to the rotational movement of the rotor 132, the wave generator 24, coupled to the rotor 132, rotates along with the rotor 132. Because the total number of the belt teeth 52 is less than the total number of spline teeth 42, when the wave generator 24 rotates in the spline 22, the rotational speed of the rotor 132 is reduced by the wave generator 24. In addition, because the wave generator 24 is in engagement with the output member 28, the output member 28 rotates with the wave generator 24. Because the total number of the wall teeth 64 is equal to the total number of the belt teeth 52, this allows the output member 28 to rotate at the same speed as the wave generator 24. Accordingly, the threaded bushing 100, attached to the output member 28, rotates with the output member 28, at the same rotational speed as the wave generator 24, and moves axially along the threaded shaft 98 to raise and lower the height of the vehicle.

Figure 9:
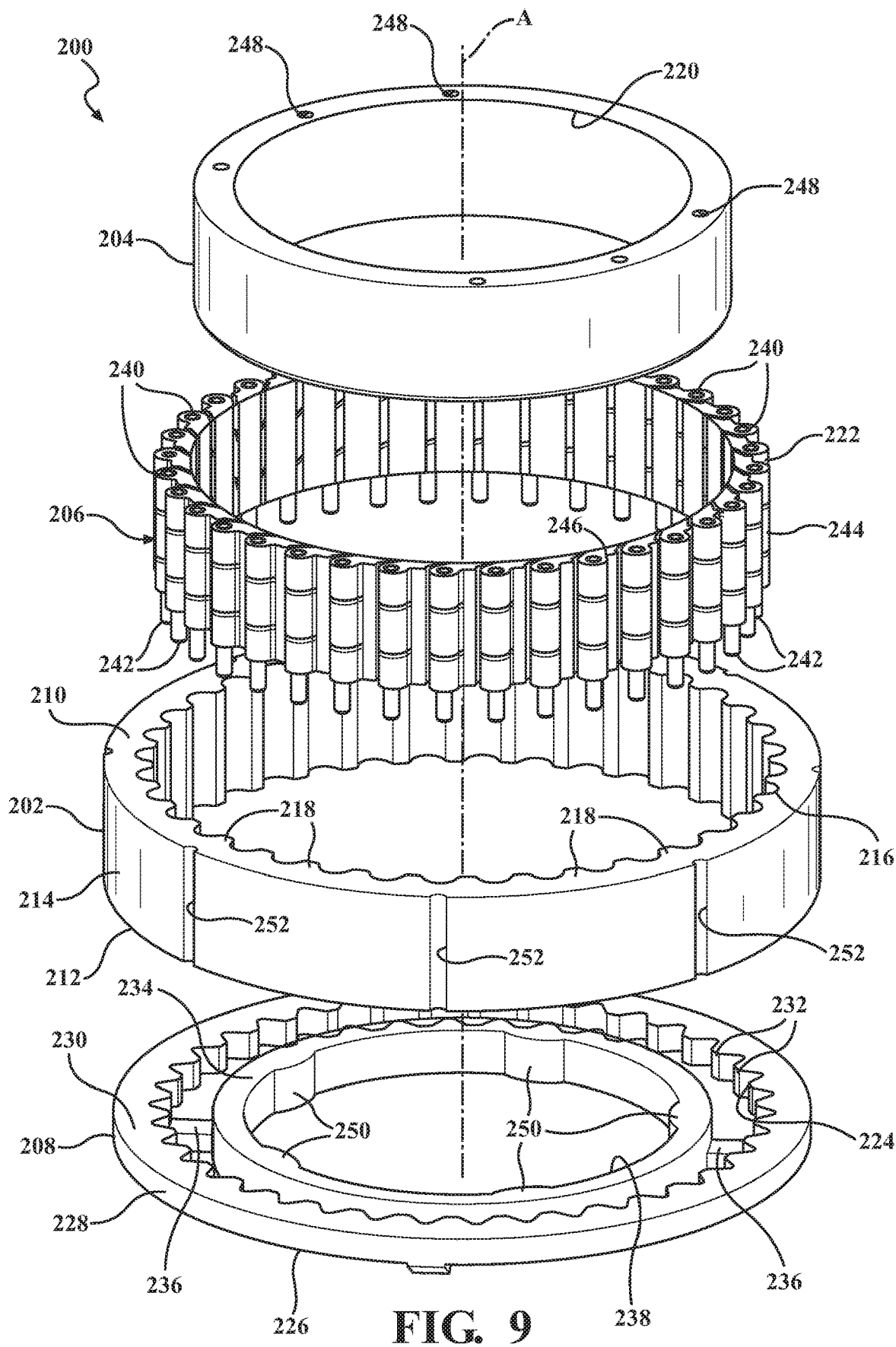
FIG. 9 is an exploded view of a wave gear apparatus constructed in accordance with another embodiment of the present invention.
Figure 10:
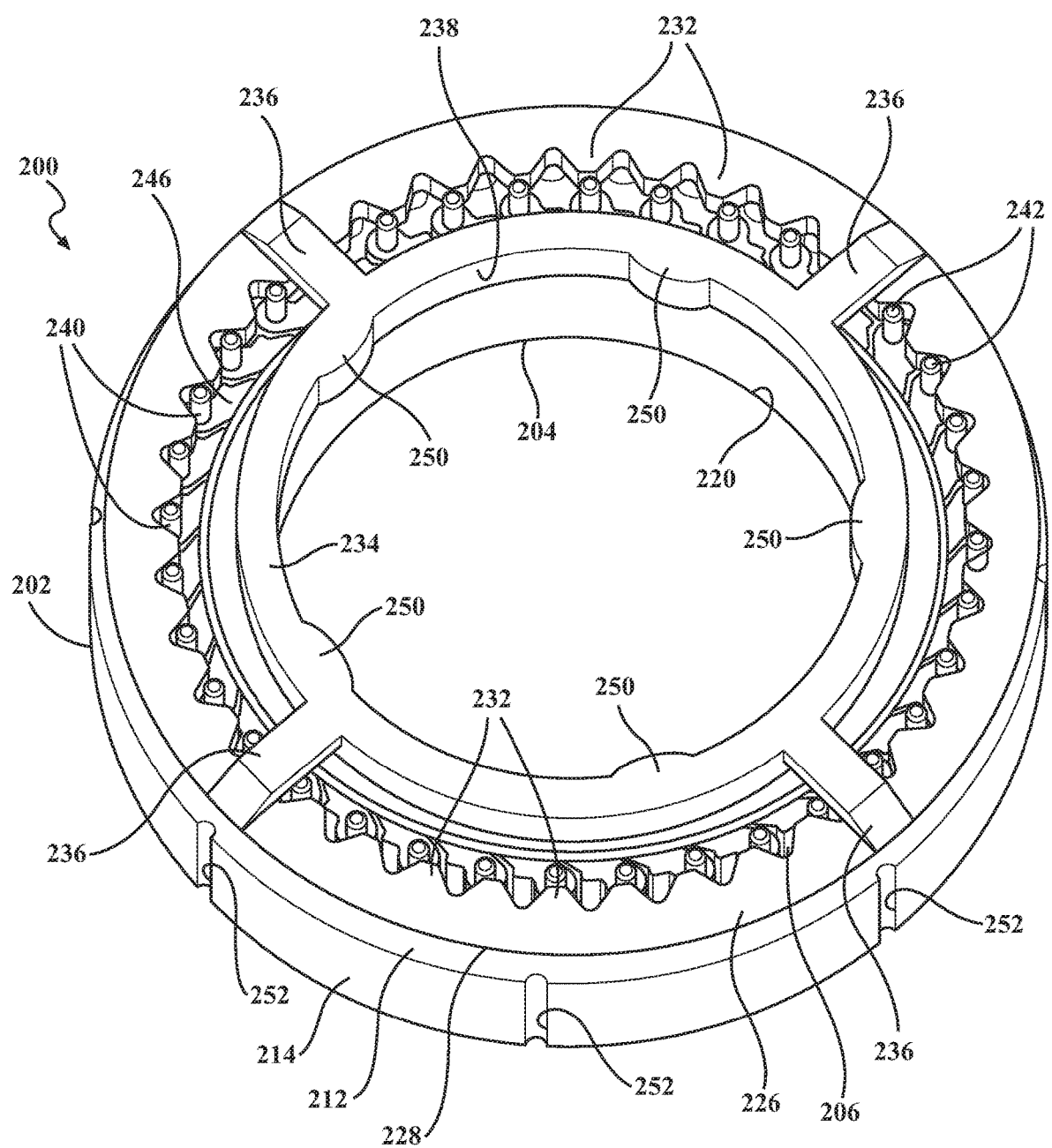
FIG. 10 is a bottom perspective view of the wave gear apparatus.
Figure 11:
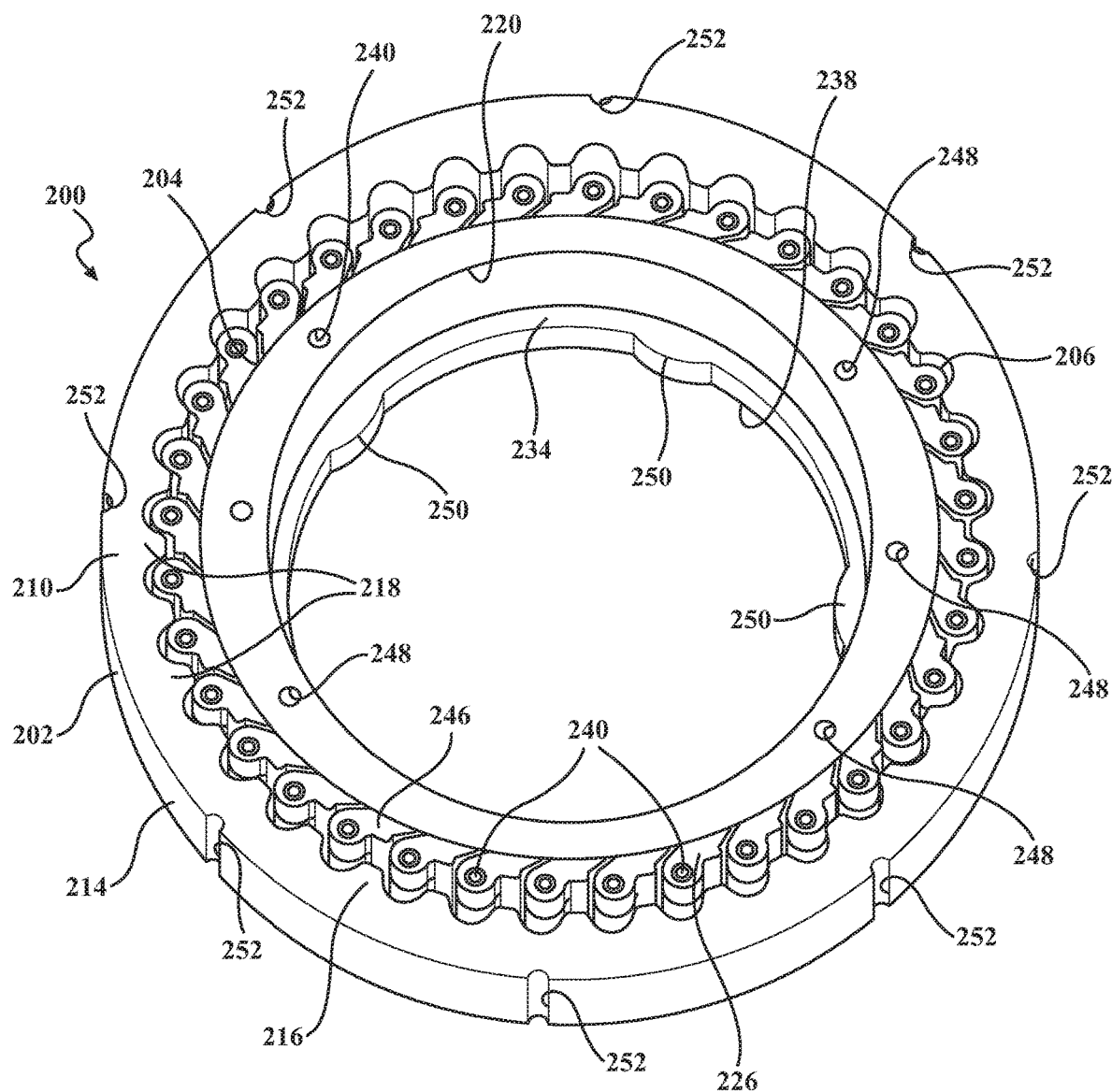
FIG. 11 is a top perspective view of the wave gear apparatus.

FIGS. 9-11 illustrates a wave gear apparatus 200 constructed in accordance with another embodiment of the present invention. The wave gear apparatus 200 comprises a spline 202, a wave generator 204, a belt 206, and an output member 208. The spline 202 has a top surface 210, a bottom surface 212, an exterior surface 214, and an interior surface 216. The top surface 210 and the bottom surface 212 are spaced apart from one another. The exterior surface 214 and the interior surface 216 extend about a center axis A connecting the top surface 210 with the bottom surface 212. The spline 202 includes a plurality of spline teeth 218 extending radially inwardly from the interior surface 216 and center axis A and circumferentially spaced from one another. Accordingly to an embodiment of the present invention, each spline tooth of the plurality of spline teeth 218 can have a generally trapezoidal shape to present a first teeth profile.

The wave generator 204 is rotatably disposed in the spline 202 for engagement with the spline 202. The wave generator 204, having a generally ring shape, extends about the center axis A. According to an embodiment of the present invention, the wave generator 204 can have an elliptical shape. The wave generator 204 defines a bore 220 extending along the center axis A through the wave generator 204. The belt 206 extends about the wave generator 204. The belt 206 includes a plurality of belt teeth 222 extending radially outwardly from the belt 206 for engaging the spline teeth 218, i.e. the belt teeth 222 diametrically meshes with the spline teeth 218, whereby a total number of the belt teeth 222 is less than a total number of the spline teeth 218. According an embodiment of the present invention, a difference between the total number of the spline teeth 218 and the total number of the belt teeth 222 is equal to 2 or 4. Because the total number of the belt teeth 222 is less than the total number of spline teeth 218, this create a reduction ratio between the rotational speed of the rotor and the rotational speed of the wave generator 204.

The output member 208 defines a recess 224 for receiving the wave generator 204 and the belt 206. The output member 208 is in engagement with the wave generator 204 and the belt 206 whereby, in response to a rotational movement from the wave generator 204, the output member 208 rotates in a direction same or opposite of the wave generator 204. With the wave generator 204 being received in the recess 224 of the output member 208, this makes the wave gear apparatus 200 more compact and allows for an easy assembly of the wave gear apparatus 200. The output member 208 includes a base plate 226, having a generally circular shape, disposed on the center axis A and in abutment relationship with the belt 206 and the wave generator 204. The base plate 226 has a periphery 228 extending about the center axis A. A wall 230 extends outwardly from the periphery 228 and about the center axis A for engagement with the spline 202. The wall 230 includes a plurality of wall teeth 232, spaced from one another, extending outwardly from the wall 230 and radially toward the center axis A for engagement with the belt 206 to allow the output member 208 to rotate in a same speed as the belt 206 and the wave generator 204. The wall teeth 232 present a second teeth profile that is different from the first teeth profile of the spline teeth 218 to allow the output member 208 to rotate in the same speed as the belt 206 and the wave generator 204. According to an embodiment of the present invention, each wall tooth of the plurality of wall teeth 232 has a generally triangular shape to present the second teeth profile. The output member 208 includes a collar 234 located radially inwardly from the wall 230 and extending annularly about the center axis A to define the recess 224 extending about the center axis A and between the collar 234, the base plate 226, and the wall 230. A plurality of connecting members 236 extend radially outwardly from the collar 234 and couple to the base plate 226 to connect the collar 234 to the base plate 226. The collar 234 extends through the bore 220 and defines a hole 238 extending along the center axis A.

Each belt tooth 222 of the plurality of belt teeth 222 includes a metal insert 240 disposed therein to provide reinforcement and rigidity to the belt teeth 222. The metal insert 240 extends along the center axis A through the belt 206 to an insert end 242 spaced apart from the belt 206. The insert end 242 is in mesh engagement with the wall teeth 232 for transferring rotational movement of the wave generator 204 to the output member 208. According to an embodiment of the present invention, the belt 206 is a chain 244 wrapped around the wave generator 204. The chain 244 includes a plurality of units 246 coupled to one another whereby each unit 246 of the plurality of units 246 includes a belt tooth 222 of the belt teeth 222. The wave generator 204 can define a plurality of orifices 248 for coupling the wave generator 204 to an electrical motor. The collar 234 includes a plurality of engagement members 250, circumferentially spaced from one another, extending radially inwardly toward the center axis A for engaging a shaft and transferring the rotational movement of the electric motor to the shaft. The exterior surface 214 of the spline 202 defines a plurality of channels 252, circumferentially spaced from one another, extending from the top surface 210 to the bottom surface 212.

In operation, an input of a rotational movement or a torque load is first introduced to the wave gear apparatus 200 via the wave generator 204 through an electric motor or any other rotational movement generating source. According to an embodiment of the present invention, the plurality of orifices 248 of the wave generator 204 can be coupled to the electric motor or the rotational movement generating source allowing the wave generator 204 to introduce the rotational movement to the wave gear apparatus 200. As the wave generator 204 rotates in the spline 202, the belt 206 deforms in response to the movement of the wave generator 204 and slides around the wave generator 204. As the belt 206 slides around the wave generator 204, the belt teeth 222 is in mesh engagement with the spline teeth 218. Because the total number of the belt teeth 222 is less than the total number of spline teeth 218, as the wave generator 204 rotates in the spline 202, the rotational speed of the wave generator 204 is reduced. In addition, as the belt 206 slides around the wave generator 204, the insert end 242 of the metal insert 240 is in mesh engagement with the wall teeth 232. Because the total number of the wall teeth 232 is equal to the total number of the belt teeth 222, the output member 208 rotates, in a direction that is the same or opposite of the rotational direction of the wave generator 204. Accordingly, because the belt teeth 222 engage both the spline teeth 218 and the wall teeth 232, a shear force is generated due to the introduction of the torque load. According to one embodiment of the present invention, the belt 206 can be made from an elastomeric material, e.g. rubber. With the belt 206 being made from the elastomeric material, it can withstand the shear force generated due to the introduction of the rotational movement or torque load thereby reducing the noise, vibration, and harshness levels (NVH) of the wave gear apparatus 200.

Figure 12:
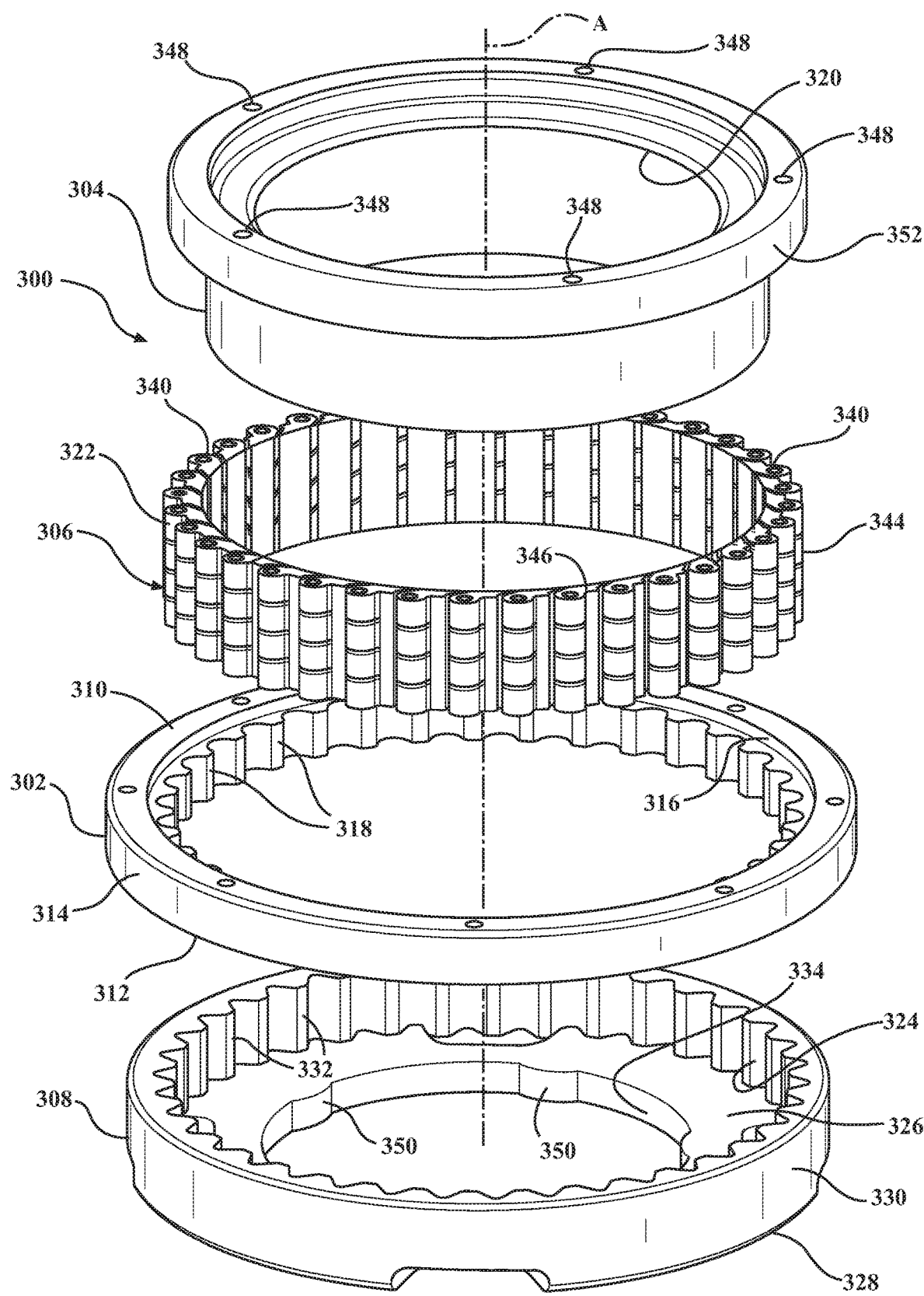
FIG. 12 is an exploded view of a wave gear apparatus constructed in accordance with another embodiment of the present invention.

FIG. 12 illustrates a wave generator apparatus 300 constructed in accordance with another embodiment of the present invention. The wave gear apparatus 300 comprises a spline 302, a wave generator 304, a belt 306, and an output member 308. The spline 302 has a top surface 310, a bottom surface 312, an exterior surface 314, and an interior surface 316. The top surface 310 and the bottom surface 312 are spaced apart from one another. The exterior surface 314 and the interior surface 316 extend about a center axis A connecting the top surface 310 with the bottom surface 312. The spline 302 includes a plurality of spline teeth 318 extending radially inwardly from the interior surface 316 and center axis A and circumferentially spaced from one another. Accordingly to an embodiment of the present invention, each spline tooth of the plurality of spline teeth 318 can have a generally trapezoidal shape to present a first teeth profile.

The wave generator 304 is rotatably disposed in the spline 302 for engagement with the spline 302. The wave generator 304, having a generally ring shape, extends about the center axis A. According to an embodiment of the present invention, the wave generator 304 can have an elliptical shape. The wave generator 304 defines a bore 320 extending along the center axis A through the wave generator 304. The belt 306 extends about the wave generator 304. The belt 206 includes a plurality of belt teeth 322 extending radially outwardly from the belt 306 for engaging the spline teeth 318, i.e. the belt teeth 322 diametrically meshes with the spline teeth 318, whereby a total number of the belt teeth 322 is less than a total number of the spline teeth 318. According an embodiment of the present invention, a difference between the total number of the spline teeth 318 and the total number of the belt teeth 322 is equal to 2 or 4. Because the total number of the belt teeth 322 is less than the total number of spline teeth 318, this create a reduction ratio between the rotational speed of the rotor and the rotational speed of the wave generator 304.

The output member 308 defines a recess 324 for receiving the wave generator 304 and the belt 306. The output member 308 is in engagement with the wave generator 304 and the belt 306 whereby, in response to a rotational movement from the wave generator 304, the output member 308 rotates in a direction same or opposite of the wave generator 304. With the wave generator 304 being received in the recess 324 of the output member 308, this makes the wave gear apparatus 300 more compact and allows for an easy assembly of the wave gear apparatus 300. The output member 308 includes a base plate 326, having a generally circular shape, disposed on the center axis A and in abutment relationship with the belt 306 and the wave generator 304. The base plate 326 has a periphery 328 extending about the center axis A. A wall 330 extends outwardly from the periphery 328 and about the center axis A for engagement with the spline 302. The wall 330 includes a plurality of wall teeth 332, spaced from one another, extending outwardly from the wall 330 and radially toward the center axis A for engagement with the belt 306 to allow the output member 308 to rotate in a same speed as the belt 306 and the wave generator 304. The wall teeth 332 can present a second teeth profile that is different from the first teeth profile of the spline teeth 318 to allow the output member 308 to rotate in the same speed as the belt 306 and the wave generator 304. According to an embodiment of the present invention, each wall tooth 332 of the plurality of wall teeth 332 has a generally triangular shape to present the second teeth profile. The output member 308 defines a perforation 334, having a generally circular shape, located on the center axis A and in communication with the bore 320.

Each belt tooth 322 of the plurality of belt teeth 322 includes a metal insert 340 disposed therein to provide reinforcement and rigidity to the belt teeth 322. According to an embodiment of the present invention, the belt 306 is a chain 344 wrapped around the wave generator 304. The chain 344 includes a plurality of units 346 coupled to one another whereby each unit 346 of the plurality of units 346 includes a belt tooth 322 of the belt teeth 322. The wave generator 304 can define a plurality of orifices 348 for coupling the wave generator 304 to an electrical motor. The base plate 326 includes a plurality of engagement members 350, circumferentially spaced from one another, extending radially inwardly toward the center axis A for engaging a shaft and transferring the rotational movement of the electric motor to the shaft. The wave generator 304 includes a flange 352, located adjacent to the orifices 348, extending radially outwardly from the wave generator 304 and annularly about the center axis A. The flange 352 is in an abutment relationship with the spline 302 to sandwich the spline 302 between the output member 308 and the wave generator 304 and prevent axial movement of the spline 302.

In operation, an input of a rotational movement or a torque load is first introduced to the wave gear apparatus 300 via the wave generator 304 through an electric motor or any other rotational movement generating source. According to an embodiment of the present invention, the plurality of orifices 348 of the wave generator 304 can be coupled to the electric motor or the rotational movement generating source allowing the wave generator 304 to introduce the rotational movement to the wave gear apparatus 300. As the wave generator 304 rotates in the spline 302, the belt 306 deforms in response to the movement of the wave generator 304 and slides around the wave generator 304. As the belt 306 slides around the wave generator 304, the belt teeth 322 is in mesh engagement with the spline teeth 318. Because the total number of the belt teeth 322 is less than the total number of spline teeth 318, as the wave generator 304 rotates in the spline 302, the rotational speed of the wave generator 304 is reduced. In addition, as the belt 306 slides around the wave generator 304, the belt 306 is also in mesh engagement with the wall teeth 332. Because the total number of the wall teeth 332 is equal to the total number of the belt teeth 322, the output member 308 rotates, in a direction that is the same or opposite of the rotational direction of the wave generator 304. Accordingly, because the belt teeth 322 engage both the spline teeth 318 and the wall teeth 332, a shear force is generated due to the introduction of the torque load. According to one embodiment of the present invention, the belt 306 can be made from an elastomeric material, e.g. rubber. With the belt 306 being made from the elastomeric material, it can withstand the shear force generated due to the introduction of the rotational movement or torque load thereby reducing the noise, vibration, and harshness levels (NVH) of the wave gear apparatus 300.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A wave gear apparatus comprising:
   a spline having a top surface, a bottom surface, an exterior surface, and an interior surface with said top surface and said bottom surface being axially spaced from one another and said exterior surface and said interior surface extending about a center axis connecting said top surface with said bottom surface;
   a plurality of spline teeth extending from said interior surface toward said center axis;
   a wave generator rotatably disposed in said spline;
   a belt extending about said wave generator, said belt including a plurality of belt teeth extending radially outwardly from said belt for engaging said spline teeth whereby a total number of said belt teeth is less than a total number of said spline teeth; and
   an output member defining a recess receiving said wave generator and said belt and in engagement with said wave generator and said belt whereby, in response to a rotational movement from said wave generator, said output member rotates in a direction same or opposite of said wave generator.

2. The wave gear apparatus as set forth in claim 1, wherein said output member includes a base plate disposed in abutment relationship with said belt and said wave generator and said base plate having a periphery extending about said center axis.

3. The wave gear apparatus as set forth in claim 2 further including a wall extending outwardly from said periphery and about said center axis for engagement with said spline.

4. The wave gear apparatus as set forth in claim 3, wherein said wall includes a plurality of wall teeth, spaced from one another, extending outwardly from said wall and radially toward said center axis for engaging said belt.

5. The wave gear apparatus as set forth in claim 4, wherein a total number of said wall teeth is equal to said total number of said belt teeth.

6. The wave gear apparatus as set forth in claim 2, wherein said output member includes a collar, located radially inwardly from said base plate, coupled to said base plate, and extending annularly about said center axis and defining a hole extending along said center axis.

7. The wave gear apparatus as set forth in claim 6, wherein said collar includes a plurality of engagement members, circumferentially spaced from one another, extending radially inwardly toward the center axis.

8. The wave gear apparatus as set forth in claim 4, wherein each tooth of said belt teeth includes a metal insert disposed therein to provide reinforcement and rigidity to said belt teeth.

9. The wave gear apparatus as set forth in claim 8, wherein said metal insert extends along said center axis through said belt to an insert end axially spaced from said belt.

10. The wave gear apparatus as set forth in claim 8, wherein said belt is a chain, said chain including a plurality of units connected to one another whereby each unit of said plurality of units includes a belt tooth of said belt teeth.

11. The wave gear apparatus as set forth in claim 9, wherein said insert end is in mesh engagement with said wall teeth.

12. The wave gear apparatus as set forth in claim 9, wherein said base plate defines a plurality of apertures disposed about said center axis to receive said insert end thereby coupling said output member to said wave generator and said belt for rotation with said wave generator and said belt.

13. The wave gear apparatus as set forth in claim 4, wherein said spline teeth has a first teeth profile and said wall teeth has a second teeth profile, said first teeth profile is different from said second teeth profile.

14. The wave gear apparatus as set forth in claim 13, wherein each tooth of said spline teeth has a generally trapezoidal shape to define said first teeth profile; and
each tooth of said wall teeth has a triangular shape to define said second teeth profile.

15. The wave gear apparatus as set forth in claim 1, wherein said wave generator includes a flange extending radially outwardly from the wave generator and annularly about the center axis, said flange being in an abutment relationship with said spline to sandwich said spline between said output member and said wave generator for preventing axial movement of said spline.

16. A wave gear apparatus comprising:
a spline having a top surface, a bottom surface, an exterior surface, and an interior surface with said top surface and said bottom surface being axially spaced from one another and said exterior surface and said interior surface extending about a center axis connecting said top surface with said bottom surface;
a plurality of spline teeth, having a first teeth profile, extending from said interior surface toward said center axis;
a wave generator rotatably disposed in said spline;
a belt extending about said wave generator, said belt including a plurality of belt teeth extending radially outwardly from said belt for engaging said spline teeth whereby a total number of said belt teeth is less than a total number of said spline teeth; and
an output member receiving said wave generator and said belt and in engagement with said wave generator and said belt whereby said output member includes a wall having a plurality of wall teeth and said wall teeth having a second teeth profile, said second teeth profile is different from said first teeth profile.

17. The wave gear apparatus as set forth in claim 16, wherein in response to a rotational movement from said wave generator, said output member rotates in a direction same or opposite of said wave generator.

18. The wave gear apparatus as set forth in claim 16, wherein said output member includes a base plate having a periphery extending annularly about said center axis; and
said wall extends outwardly from said periphery and about said center axis for engagement with said spline.

19. The wave gear apparatus as set forth in claim 18, wherein said wall teeth, spaced from one another, extend outwardly from said wall and radially toward said center axis for engaging said belt.

20. The wave gear apparatus as set forth in claim 18, wherein a total number of said wall teeth is equal to said total number of said belt teeth.

21. The wave gear apparatus as set forth in claim 16, wherein each tooth of said spline teeth has a generally trapezoidal shape to define said first teeth profile; and
each tooth of said wall teeth has a generally triangular shape to define said second teeth profile.

22. The wave gear apparatus as set forth in claim 18, wherein said output member includes a collar, located radially inwardly from said base plate, coupled to said base plate, and extending annularly about said center axis and defining a hole extending along said center axis.

23. The wave gear apparatus as set forth in claim 22, wherein said collar includes a plurality of engagement members, circumferentially spaced from one another, extending radially inwardly toward the center axis.

24. The wave gear apparatus as set forth in claim 16, wherein each tooth of said belt teeth includes a metal insert disposed therein to provide reinforcement and rigidity to said belt teeth.

25. The wave gear apparatus as set forth in claim 24, wherein said metal insert extends along said center axis through said belt to an insert end axially spaced from said belt.

26. The wave gear apparatus as set forth in claim 24, wherein said belt is a chain, said chain including a plurality of units connected to one another whereby each unit of said plurality of units includes a belt tooth of said belt teeth.

27. The wave gear apparatus as set forth in claim 26, wherein said insert end is in mesh engagement with said wall teeth.

28. The wave gear apparatus as set forth in claim 16, wherein said wave generator includes a flange extending radially outwardly from the wave generator and annularly about the center axis, said flange being in an abutment relationship with said spline to sandwich said spline between said output member and said wave generator for preventing axial movement of said spline.

* * * * *